United States Patent [19]
Scott

[11] 3,922,913
[45] Dec. 2, 1975

[54] FLOWMETER

[76] Inventor: Norman D. Scott, Route 2, Box 409, Daytona Beach, Fla. 32019

[22] Filed: Apr. 10, 1974

[21] Appl. No.: 459,902

[52] U.S. Cl. .................... 73/219; 73/424; 128/2 F
[51] Int. Cl.² .......................................... G01F 3/24
[58] Field of Search ........ 73/219, 424; 128/2 F, 295

[56] References Cited
UNITED STATES PATENTS

| | | | |
|---|---|---|---|
| 2,792,836 | 5/1957 | Reynolds et al. | 73/424 |
| 3,194,069 | 7/1965 | Scott | 73/219 |
| 3,561,427 | 2/1971 | Profy | 73/219 |
| 3,633,422 | 1/1972 | Grieshaber | 73/219 |

FOREIGN PATENTS OR APPLICATIONS

| 319,623 | 4/1957 | France | 73/424 |
|---|---|---|---|

*Primary Examiner*—Herbert Goldstein
*Assistant Examiner*—Anthony V. Ciarlante
*Attorney, Agent, or Firm*—Clarence A. O'Brien; Harvey B. Jacobson

[57] ABSTRACT

A flowmeter to measure urine specimens incorporating a turntable supporting a predetermined number of beakers in underlying relation to a funnel receiving urine during each elimination cycle with the turntable being driven at a precise speed so that the rate of discharge during predetermined increments of the urine elimination cycle may be measured. Specifically, thirty beakers are supported on the turntable in close proximity to each other with the turntable being accurately rotated at two revolutions per minute so that all of the urine discharged during a single urine elimination cycle which usually requires no more than twenty-one seconds will be collected in the beakers with the beakers indicating the variation in rate of flow of the urine discharge and enabling a urine sample from predetermined portions of the elimination cycle to be analyzed to facilitate diagnosis of illnesses and the like by doctors, urologists or the like.

6 Claims, 2 Drawing Figures

FLOWMETER

BACKGROUND OF THE INVENTION

1. Field of the Invention

The present invention generally relates to a flowmeter for measuring urine specimens and more particularly a device for measuring the urine discharged and separating the urine discharged during successive increments of a urine elimination cycle.

2. Description of the Prior Art

Devices for collecting urine in a series of collection chambers are known and typical of such devices are those shown in prior U.S. Pat. Nos. 3,194,069, issued July 13, 1965; 3,633,422, issued Jan. 11, 1972 and 2,792,836, issued May 21, 1967. The first two mentioned patents employ a rotatable pan having a discharge opening for alignment with a plurality of compartments in order to measure the hourly urine output of a patient whereas the last mentioned patent employs a turntable which also is to collect the urine discharged by a patient over a predetermined time period in a receptacle.

SUMMARY OF THE INVENTION

While it is desirable to determine the urine produced by a patient over a predetermined time period, in certain instances, it is desirable to determine the rate of discharge of urine during a single urine elimination cycle and also to be able to analyze the urine during a particular increment of the urine elimination cycle. Inasmuch as a urine elimination cycle is completed normally within a twenty-one second time period, it is an object of the present invention to provide a turntable with a plurality of beakers supported thereon for movement under a funnel or other guide device at a predetermined rate with the turntable being driven at an accurate speed so that each revolution of the turntable will be at least as long as the normal urine elimination cycle.

Another object of the invention is to provide a flowmeter in the form of a turntable having thirty closely spaced beakers supported at a predetermined distance from the center of rotation of the turntable with the turntable being accurately driven at a relatively slow speed such as 2 r.p.m. so that each revolution of the turntable will require thirty seconds which is in excess of the urine elimination cycle thus assuring that all urine will be collected and measured and that the urine discharged for each increment of the urine elimination cycle will be separately collected, measured and capable of analysis.

Still another object of the invention is to provide a flowmeter in accordance with the preceding objects in which the structure of the flowmeter is relatively simple but extremely accurate, easy to clean and maintain in a sanitary condition, long lasting and dependable and relatively inexpensive as compared with present commercially available devices thus rendering the device economically feasible for individual doctors, urologists and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
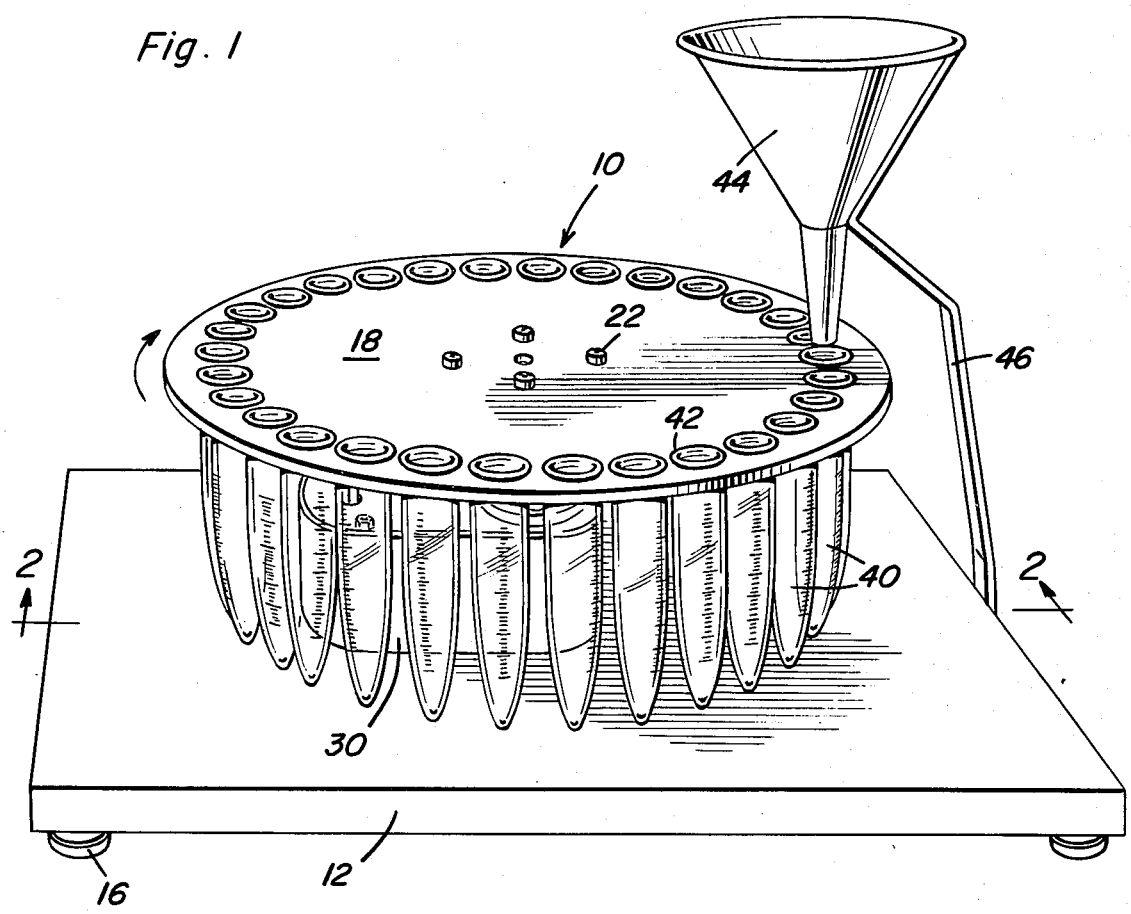
FIG. 1 is a perspective view of the flowmeter of the present invention.

Referring now specifically to the drawings, the flowmeter of the present invention is generally designated by numeral 10 and includes a supporting base 12 of any suitable shape and configuration which enables the device to be easily handled so that it can be oriented in a desired location for use. The base 12 may be in the form of a panel or plate supported from a supporting surface 14 by a plurality of supporting pads or feet 16 which support the base in elevated position to enable it to be lifted and carried to a desired location for use.

Disposed above the supporting base and generally in overlying relation thereto is a circular plate or disc 18 which forms a turntable for rotation about a vertical axis defined by a vertical shaft 20 to which the plate or turntable 18 is secured by fastener bolts 22 extending through the plate or turntable 18 and spacers 24 thereunder into a pulley 26 which is fixed to the shaft 20 in any suitable manner such as by a key or flattened portion on the shaft 20 thus rigidly securing the pulley 26 and plate or turntable 18 securely together but enabling disassembly of these components when desired. The shaft 20 is journaled in a bearing housing 28 or the like carried by an electric motor and reduction gear unit 30 having an output shaft 32 extending upwardly therefrom in parallel relation to the shaft 20 with a pulley 34 being fixed to the shaft 32 in a conventional and well known manner. The pulley 34 is in alignment with the pulley 32 and both pulleys are provided with a V-groove in the periphery thereof for receiving a V-belt 36 thus driving the pulley 26 from the pulley 34. The reduction gear drive unit combined with the relative diameter of the pulley 34 and the pulley 26 drives the pulley 26, shaft 20 and turntable or plate 18 at a predetermined accurate rotational speed such as 2 r.p.m. with the speed of rotation being constant and extremely accurate.

The plate or turntable 18 is 15 inches in diameter and includes thirty equally spaced holes 38 adjacent the periphery thereof with each of the holes 38 receiving a transparent beaker 40 which has a closed lower end and an outwardly flared upper end 42 resting against the upper surface of the turntable 18 thus enabling the beakers to be placed into the holes 38 or removed therefrom in a simple and effective manner. The beakers 40 may be of any suitable configuration but of a length less than the distance between the turntable and the base and may be graduated to indicate the volume of material received therein.

Figure 2:
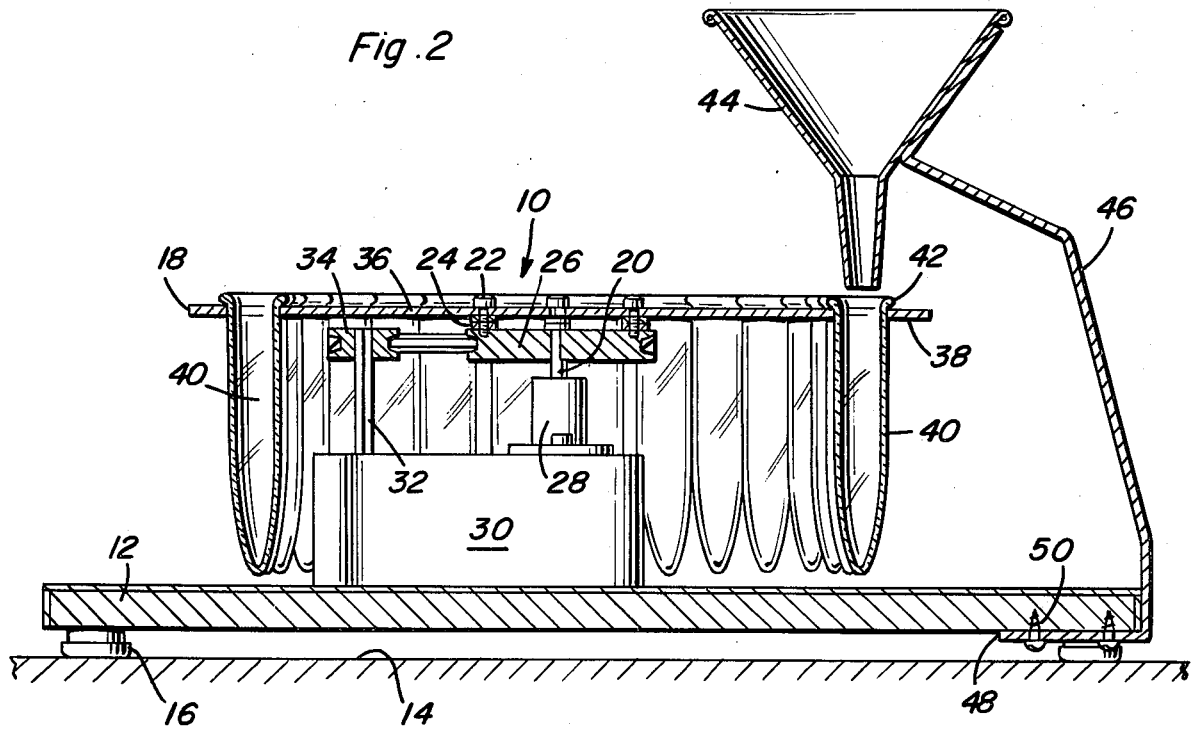
FIG. 2 is a vertical sectional view taken substantially upon a plane passing along section line 2—2 of FIG. 1 illustrating the structural details of the invention.

A guide funnel 44 is supported in overlying relation to the open upper end of the beakers 40 by a supporting bracket 46 which extends downwardly to the base 12 and includes an inwardly extending lower end portion 48 underlying the base 12 and secured thereto by suitable fasteners 50 or the like thus maintaining the discharge end of the funnel 44 in superimposed but closely spaced relation to the open upper end of the beakers 40 as illustrated in FIG. 2.

The base or table is preferably rectangular in configuration and has a minor dimension approximately equal to the diameter of the turntable. The thirty holes in the turntable are preferably 1.145 inch in diameter for receiving commercially available glass beakers 40. An electrical supply cord (not shown) is connected with the gear motor 30 and is provided with a manual switch for control of the turntable. The turntable and other components may be constructed of aluminum or other suitable materials, including plastics, and the base 12 may be provided with a laminated covering of waterproof material facilitating the retention of the device in a clean and sanitary condition. Rotation of the turntable at 2 r.p.m.'s provides for a complete revolution of the turntable in thirty seconds which will assure that the beakers on the turntable will only be aligned with the discharge of the funnel during a single increment of the urine elimination cycle. This assures accurate measurement of the urine discharged in each increment of the urination cycle and enables analysis of the urine discharged in each of such increments.

By employing commercially available items of predetermined dimensions and structural characteristics, the overall cost of the device is maintained at a minimum and the device is substantially maintenance free thereby enabling an individual practitioner, doctor, urologist or the like to obtain a unit for his office, clinic or the like.

The foregoing is considered as illustrative only of the principles of the invention. Further, since numerous modifications and changes will readily occur to those skilled in the art, it is not desired to limit the invention to the exact construction and operation shown and desired, and accordingly all suitable modifications and equivalents may be resorted to, falling within the scope of the invention.

What is claimed as new is as follows:

1. A flowmeter for measuring the rate of urine discharge during discrete increments of a urine elimination cycle of approximately 21 seconds by measuring the quantity of urine discharged during each such increment and providing a separate specimen for each such increment for analysis comprising a turntable, means rotatably supporting said turntable for rotation about a vertical axis, means driving said turntable at a predetermined constant slow speed whereby the turntable will turn less than one revolution during a complete cycle of urine elimination, a plurality of receptacles carried by said turntable circumferentially about the center of rotation, and urine guide means disposed above the receptacles for discharging urine into the receptacle, each receptacle having graduations thereon to indicate the quantity of urine discharged therein during the predetermined time increment that it is aligned with the guide means, said means driving the turntable including a motor and reduction gear unit disposed under said turntable and connected to the turntable for rotating the turntable at 2 r.p.m., said turntable including 30 receptacles mounted thereon for alignment with the guide means for a period of one second.

2. The flowmeter as defined in claim 1 wherein said receptacles are in the form of transparent beakers having an open and outwardly projecting upper end resting vertically in apertures formed in the turntable to facilitate support of the beakers and enable easy removal and replacement thereof.

3. The flowmeter of claim 2 wherein said urine guide means is in the form of a funnel having a discharge spout disposed in close overlying relation to the receptacles.

4. The flowmeter of claim 3 wherein said means supporting the turntable includes a portable base, shaft means supporting said turntable for rotation about a vertical axis.

5. The method of measuring the quantity of urine discharged by a patient during a large number of discrete increments in a normal urine elimination cycle having a total duration of approximately twenty one seconds comprising the steps of guiding the urine discharged by the patient to a vertical gravity discharge without any substantial flow restriction, moving a plurality of receptacles sequentially under the vertical discharge at an accurate constant rate for alignment of each receptacle with the vertical discharge for a predetermined time increment with each receptacle being aligned with vertical discharge for exactly the same increment of the urine elimination cycle, and measuring the quantity of urine collected in each receptacle to provide indication of any variation in the discharge rate of urine during the elimination cycle.

6. The method as defined in claim 5 wherein the step of moving the receptacles includes the step of supporting thirty receptacles on a turntable rotatable at 2 r.p.m. whereby each receptacle will be aligned with the vertical discharge for one second.

* * * * *